United States Patent [19]
Obata

[11] Patent Number: 5,204,850
[45] Date of Patent: Apr. 20, 1993

[54] LOADING APPARATUS FOR A DISC-SHAPED RECORDING MEDIUM

[75] Inventor: Katsuyuki Obata, Tokyo, Japan

[73] Assignee: Sony Corporation, Tokyo, Japan

[21] Appl. No.: 570,136

[22] Filed: Aug. 20, 1990

[30] Foreign Application Priority Data

Aug. 31, 1989 [JP] Japan .................................. 1-225317

[51] Int. Cl.[5] ........................ G11B 25/04; G11B 17/04
[52] U.S. Cl. .................................. 369/75.2; 369/263; 369/75.1; 360/99.02; 360/99.06
[58] Field of Search ...................... 369/75.2, 77.1, 263, 369/258, 36, 270, 271; 360/99.02, 99.03, 99.06, 99.07, 99.12

[56] References Cited

U.S. PATENT DOCUMENTS

| | | | |
|---|---|---|---|
| 4,686,594 | 8/1987 | Kurafuji . | |
| 4,731,777 | 3/1988 | Yoshitoshi et al. | 369/263 |
| 4,945,433 | 7/1990 | Suzuki et al. | 360/99.02 |
| 4,979,161 | 12/1990 | Verhagen | 369/263 X |
| 5,025,339 | 6/1991 | Kanno et al. | 360/99.02 |
| 5,062,099 | 10/1991 | Odawara et al. | 369/263 |

FOREIGN PATENT DOCUMENTS

| | | |
|---|---|---|
| 3505339 | 8/1985 | Fed. Rep. of Germany . |
| 2219487 | 1/1974 | France . |
| 63-206982 | 8/1988 | Japan .................................. 369/263 |

OTHER PUBLICATIONS

Patent Abstracts of Japan, vol. 11, No. 383 (P-646) 15 Dec. 1987 & JP-A-62 149064 (Matsushita Electric).
Patent Abstract of Japan, vol. 7, No. 286 (P-244) (1431) 21 Dec. 1983 & JP-A-58 161 187 (Hitachi) 24 Sep. 1983.

*Primary Examiner*—Stuart S. Levy
*Assistant Examiner*—Joseph A. Rhoa
*Attorney, Agent, or Firm*—William S. Frommer; Alvin Sinderbrand

[57] ABSTRACT

A loading apparatus for a disc-shaped recording medium including a disc transport unit having, in turn, a disc tray movable between a position protruding from a casing of the apparatus for exchanging a disc-shaped recording medium and an internal position for reproducing the recording medium by a player section, and a unit for suppressing vibrations produced in the disc tray by thrusting against the disc tray when the disc tray is at the position for reproducing the recording medium by the player section.

8 Claims, 9 Drawing Sheets

FIG.12

LOADING APPARATUS FOR A DISC-SHAPED RECORDING MEDIUM

BACKGROUND OF THE INVENTION

1. Field of the Invention

This invention relates to a loading apparatus for a disc-shaped recording medium in which a disc tray supporting the disc-shaped recording medium or record disc is moved between an external disc exchanging position for exchanging the recording medium and an internal playing position for reproduction of information recorded on the medium. More particularly, this invention relates to a loading apparatus having a vibration suppressing unit for suppressing vibrations of the disc tray when the disc tray is in the internal playing position.

2. Description of the Prior Art

An apparatus for recording on and/or reproducing from a disc shaped recording medium, such as an optical disc or a magneto-optical disc with the aid of an optical pickup system is known. Such a disc recording and/or reproducing apparatus is disclosed in the Japanese Utility Model Publication No. 19955/1988 and Japanese patent Publication No. 48162/1986. With this known apparatus, the disc rests on a rotatable disc table which is, in turn, mounted on a supporting base member. An optical pickup adapted to be moved between the inner periphery and the outer periphery of the record disc is also provided on the supporting base member. The supporting base member is, in turn, provided within an outer casing. With this apparatus, the optical pickup unit and the axis of rotation of the disc table are fixed relative to the supporting base member.

This type of disc recording and/or reproducing apparatus is provided with a loading apparatus, the loading apparatus being provided, in turn, with a disc tray adapted for transporting the disc between an external position outside of the casing and an internal position registering with the disc table. That is, the disc tray of the loading apparatus, on which rests the disc, is adapted to be moved between the position in which the disc tray protrudes from the casing and the position in which the disc tray is generally inside the casing and placed on the disc table. The disc tray is also provided with a disc lifting unit. This lifting unit lowers the disc relative to the disc tray along the axis of the disc table to prevent the disc from abutting against the disc table or the optical pickup unit during disc transport and to cause the disc to be placed on the disc table when the disc is positioned over the disc table. Thus, the disc lifting unit has a disc rest movably supported along the axis of the disc table by the disc tray. The disc lifting unit is adapted to be moved by an actuating unit including a cam plate or like member.

The disc recording and/or reproducing apparatus is provided with a disc clamping unit supported so that it is vertically movable on top of the disc table. This disc clamping unit is so constructed and arranged that, when the disc is placed on the disc table, the clamping unit is moved towards the disc table to clamp the disc in cooperation with the disc table.

To load the disc in the player section with the aid of the above described disc loading apparatus, the disc tray is moved to the outside of the casing and the disc is placed on the disc rest of the disc tray. The disc tray is then moved into the inside of the casing. At this time, the disc is moved above the disc table while it is supported on the disc rest. When the disc tray is moved to the position where the center of the disc lies on the axis of the disc table, the disc rest is moved towards the disc table so that the disc is placed on the disc table. The disc clamping unit is then moved towards the disc table for clamping the disc between the clamping unit and the disc table. The information signals may then be recorded or reproduced in this state on or from the disc by means of the optical pickup unit.

With a disc recording and/or reproducing apparatus, having the above described loading apparatus, the disc tray, the disc rest of the disc lifting unit and the disc clamping unit are positioned in the recording and/or reproducing mode by, for example, abutment against associated positioning elements. The disc tray, disc rest and disc clamping unit are simply positioned and held by separate locking pawls or like elements without being secured mechanically. For this reason, the disc tray, the disc rest or the disc clamping unit may be excited into resonant vibrations in resonance due to extraneous vibrations or movements of the objective lens in the optical pickup unit as a result of the focusing or tracking servo control operations.

When the components of the disc recording and/or reproducing apparatus are excited in this manner into vibrational movements, these movements may be propagated to the optical pickup unit or the disc, making it difficult to perform satisfactory focusing or tracking servo control operations. As a result, more powerful servo operations are necessary, which in turn increases the driving current required for the servo operation and causes fluctuations in the driving currents. With the increased intensity of or fluctuations in the driving current, the power supply unit provided in the disc recording and/or reproducing apparatus for furnishing the driving current is rendered electrically unstable.

The power supply unit also furnishes the current necessary for processing the information signals read from the disc or recorded thereon by means of the optical pickup unit. Therefore, when the power supply unit is in an unstable state, information signals cannot be recorded or reproduced satisfactorily.

OBJECTS AND SUMMARY OF THE INVENTION

It is a principal object of the present invention to provide a disc loading apparatus having a disc tray adapted to be moved between a position in which the tray is protruded outwardly from the apparatus to permit disc exchange and a position in which the disc is transferred into the inside of the casing for reproducing or playback of the disc by the player section wherein, when the disc tray reaches the latter position for reproducing the disc, the disc tray is thrust against and supported to prevent generation of vibrations during reproduction from the disc.

It is another object of the present invention to provide a disc loading apparatus adapted to prevent resonances or vibrations of the components making up the disc loading apparatus, such as the disc tray, so as to enable satisfactory recording and/or reproduction of the information signals.

The present invention provides a disc loading apparatus comprising a disc tray movable between disc-exchanging position in which the disc tray protrudes outside the main body of the apparatus to permit disc exchange and an internal or loaded position in which the disc is transferred into the main body or casing to permit reproduction from the disc by the player section and a thrusting supporting unit so arranged that, when the disc tray has been transferred to the internal or loaded position, the disc tray is thrust against and supported by the thrusting supporting unit. The disc tray is then safeguarded against vibrations by being thus thrust against and supported by the thrusting and supporting unit.

More specifically, with the disc loading apparatus according to the present invention, the disc tray is movably supported on the chassis and is moved in a plane towards the disc table, the disc table is mounted for axial rotation on a movable base member, and the base member is movably supported on the chassis. When the movable base member is moved to the position where the disc is clamped between a disc table and a disc holding unit mounted opposite to the disc table, the disc tray is thrust and supported by the thrusting supporting unit against the supporting base member in a direction normal to the plane of motion of the disc tray.

Hence, with the present loading apparatus, when the disc recording and/or reproducing apparatus is in the recording and/or reproducing mode and the information signals are recorded and/or reproduced, it is possible to prevent the disc tray from being vibrated due to extraneous vibrations or vibrations caused by the focusing or tracking servo control operations. In addition, with the present loading apparatus, the disc holding unit is not moved and can be fixedly mounted on the chassis so that it can be safeguarded against vibrations in the recording and/or reproducing mode.

With the use of the disc loading apparatus of the present invention, it becomes possible to prevent recording and/or reproducing properties of the information signals from being deteriorated due to vibrations of the disc tray or the disc holding unit, thus realizing satisfactory recording and/or reproduction.

The loading apparatus of the present invention may be advantageously employed in a car-mounted or portable disc recording/reproducing apparatus since the information signals can be recorded and/or reproduced even under the influences of extraneous vibrations.

DETAILED DESCRIPTION OF PREFERRED EMBODIMENTS

With reference to the drawings, certain preferred embodiments of a disc loading mechanism in accordance with the present invention will be explained in detail.

Figure 1:
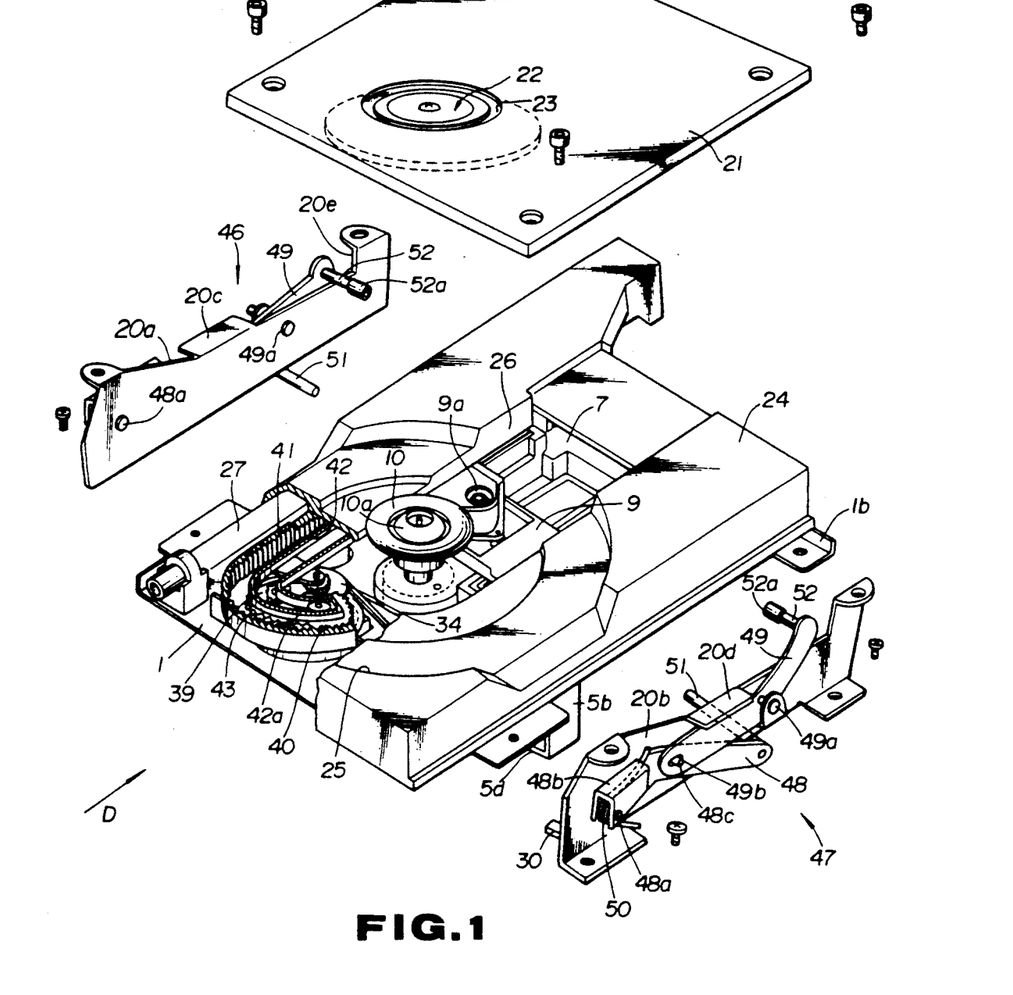
FIG. 1 is a partially exploded perspective view of a disc loading apparatus according to an embodiment of the present invention.
Figure 2:
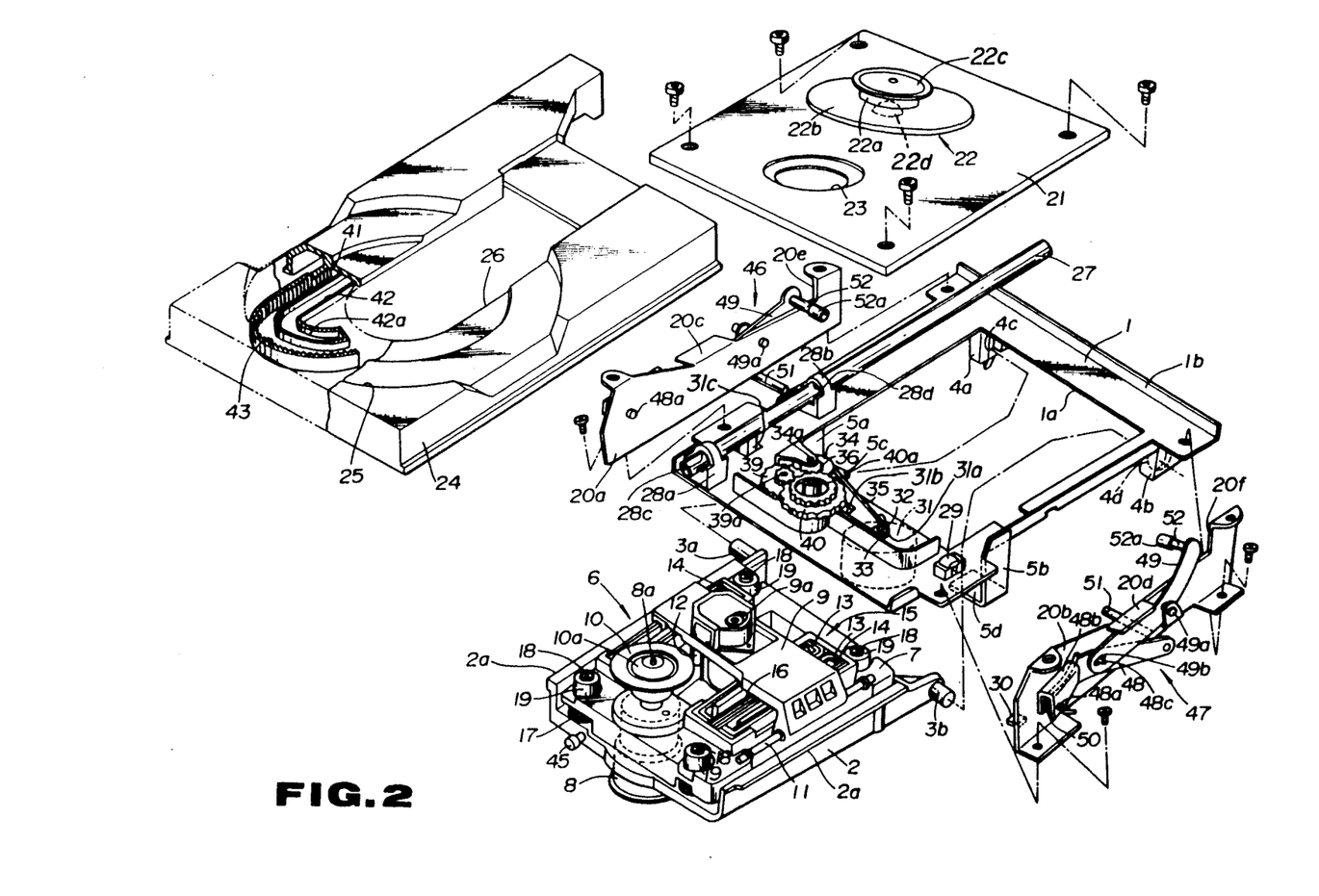
FIG. 2 is an exploded perspective view of the disc loading apparatus shown in FIG. 1.

The disc loading mechanism according to the present invention includes, as shown in FIGS. 1 and 2, a chassis 1 operating as a supporting base member. This chassis 1 is fixedly provided in an outer casing, not shown, of a disc recording and/or reproducing apparatus, also not shown. This chassis 1 is formed by a plate made of metal or like material and in the form of a rectangular frame. Chassis 1 has a substantially rectangular central opening 1a which substantially registers with a disc drive unit supporting plate 2 operating as a movable base member. The chassis 1 is formed with an upstanding wall 1b on its rear edge, that is, opposite the forward edge of the chassis where the disc is introduced, as indicated by arrow D in FIG. 1.

The disc drive unit supporting plate 2 is formed from suitable synthetic resin and is in the form of a rectangle which is slightly larger in contour than the opening 1a. This disc drive unit supporting plate 2 is supported for rocking with respect to the chassis 1. To this end, both rear sides of the disc drive unit supporting plate 2 are formed with two outwardly projecting pivot shafts 3a, 3b. These pivot shafts 3a, 3b are accommodated within supporting bores 4c, 4d formed in the opposite inner sides of a pair of supporting projections 4a, 4b extending from both side edges of the lower surface of the chassis 1 at the back of opening 1a. A pair of rotation restricting tabs 5a, 5b are provided on both lateral sides on the lower surface of the chassis 1 ahead of the opening 1a. These tabs 5a, 5b extend downwardly from the lower side of the chassis 1 and are each bent inwardly at substantially a right angle to form end sections 5c, 5d which face inwardly towards each other. These end sections 5c, 5d face the lower surface of the disc drive unit supporting plate 2. The disc drive unit supporting plate 2 is thus rockably supported by the chassis 1 and may be rocked from a position abutting chassis 1 for closing the opening 1a to a position away from the lower surface of the chassis 1 to bring it into abutment with the end sections 5c, 5d of the tabs 5a, 5b.

A disc drive unit 6 is mounted on the upper surface of the disc drive unit supporting plate 2. This disc drive unit 6 has a substantially plate-shaped unitary base member 7 on which is mounted a spindle motor 8 and an optical pickup unit 9.

The spindle motor 8 is mounted at the forward side of the unitary base member 7. A motor shaft or a spindle shaft 8a extends from the motor in a direction substantially orthogonal to the unitary base member 7, that is, in a direction along which the disc drive unit supporting plate 2 may be moved. On the upper end of the spindle shaft 8a, there is mounted a disc-shaped disc table 10 which is rotationally driven by the spindle motor 8. A boss 10a is formed centrally on the upper surface of the disc table 10 and is adapted to be introduced into a chucking opening formed at the center of the record disc when the latter is concentrically situated on the upper surface of the disc table 10.

The optical pickup unit 9 is adapted to irradiate a light beam on the signal recording surface of the disc resting on the disc table 10, by way of an objective lens 9a, and to detect the light beam reflected from the signal recording surface to read out predetermined information signals. This optical pickup unit 9 has a casing having one lateral side slidably supported by a bearing shaft 11 mounted on the unitary base member 7. The casing of the optical pickup unit 9 also carries a rotatable guide wheel 12 which is abutted against and supported by a guide section of the unitary base member 7. With the optical pickup unit 9 supported in this manner, the objective lens 9a may be moved in a direction normal to the spindle shaft 8a, that is, in a direction traversing the disc from its inner periphery towards its outer periphery or vice versa. A plurality of coils 16 cooperate with a plurality of bar-like magnets 13 and yokes 14 mounted on the unitary base member 7 to make up a linear motor unit 15, and are mounted on the casing of the optical pickup unit 9. The pickup unit 9, thus supported by the bearing shaft 11, may be moved in the aforementioned direction by means of the linear motor unit 15, with the unitary base member 7 supporting the guide wheel 12.

The disc drive unit 6 is supported in essentially a floating state with respect to the disc driving unit supporting plate 2 by means of four compression coil springs 17. Four supporting pins 18 are provided on the upper surface of the disc drive unit supporting plate 2 to be introduced into supporting holes 7a at the four corners of the unitary base member 7. Retention members 19 are provided at the upper ends of the four supporting pins 18 for inhibiting accidental extraction of the supporting pins 18. The above mentioned compression coil springs 17 are wrapped about the supporting pins 18 and interposed in this state between the unitary base member 7 and the disc drive unit supporting plate 2.

First and second lateral wall sections 20a, 20b are mounted on both lateral sides of the upper surface of the chassis 1, such as by set screws, not shown. A ceiling plate 21 is also mounted across the upper ends of the first and second wall sections 20a, 20b, such as by set screws, also not shown. Thus, the ceiling plate 21 is supported on top of the chassis 1 and at a predetermined spacing from and parallel to the chassis 1.

A disc holding unit 22 adapted to clamp the disc in cooperation with the disc table 10 is mounted on the ceiling plate 21. The disc holding unit 22 is made up of a main body 22a in the form of a cylinder, a disc-holding, disc-shaped section 22b provided on the lower end of the main body 22a facing the disc table 10, and a disc-shaped retention section 22c mounted on the upper end of the main body 22a. Both disc-shaped section 22b and retention section 22c are larger in diameter than the main body 22a. A recess 22d for mating with the boss 10a of the disc table 10 is formed at the center on the lower surface of the disc-holding, disc-shaped section 22b. The disc holding unit 22 is supported by the ceiling plate 21 for rotation and for vertical movement relative thereto within a predetermined range. For this purpose, the body member 22a is loosely fitted into a supporting through-hole 23 provided in the ceiling plate 21 at a position facing the disc table 10, the through-hole 23 being slightly larger in diameter than the main body 22a. A permanent magnet, not shown, is provided within the interior of the main body 22a for magnetically attracting the disc holding unit 22 towards the disc table 10, with the disc-shaped, disc holding section 22b abutting the disc table 10 with a record disc therebetween.

A disc tray 24 is supported and mounted on the chassis 1 within a space between the chassis 1 and the ceiling plate 21 for movement in the fore and aft direction. The disc tray 24 is formed as a rectangular plate having a width such that the tray can be inserted between the side wall sections 20a and 20b. A circular recess 25 for snugly receiving the record disc is formed on the upper surface of the disc tray 24. A through-hole 26 extends from the center towards the rear of the circular recess 25 so that the disc table 10 and the objective lens 9a of the optical pickup unit 9 may directly face the disc. The disc tray 24 is supported on the chassis 1 by a supporting shaft 27 mounted on one lateral side of the tray 24 to permit movement of the tray 24 along the shaft in the fore and aft direction. The supporting shaft 27 slidably supports the tray 24 by having both its ends mounted on the lower surface of the disc tray 24 and its mid portion offset from the tray 24 and introduced into supporting holes 28c, 28d of disc tray supporting elements 28a, 28b provided on the upper surface of one lateral side of the chassis 1. The disc tray 24 is carried on its other lateral side by a guide roll 29 provided on the forward side of the chassis 1. The movement of the disc tray upwardly in a direction away from the chassis 1 is restricted by a retention member 30 provided on the forward inner lateral side of the side wall section 20b at the aforementioned other lateral side.

Figure 3:
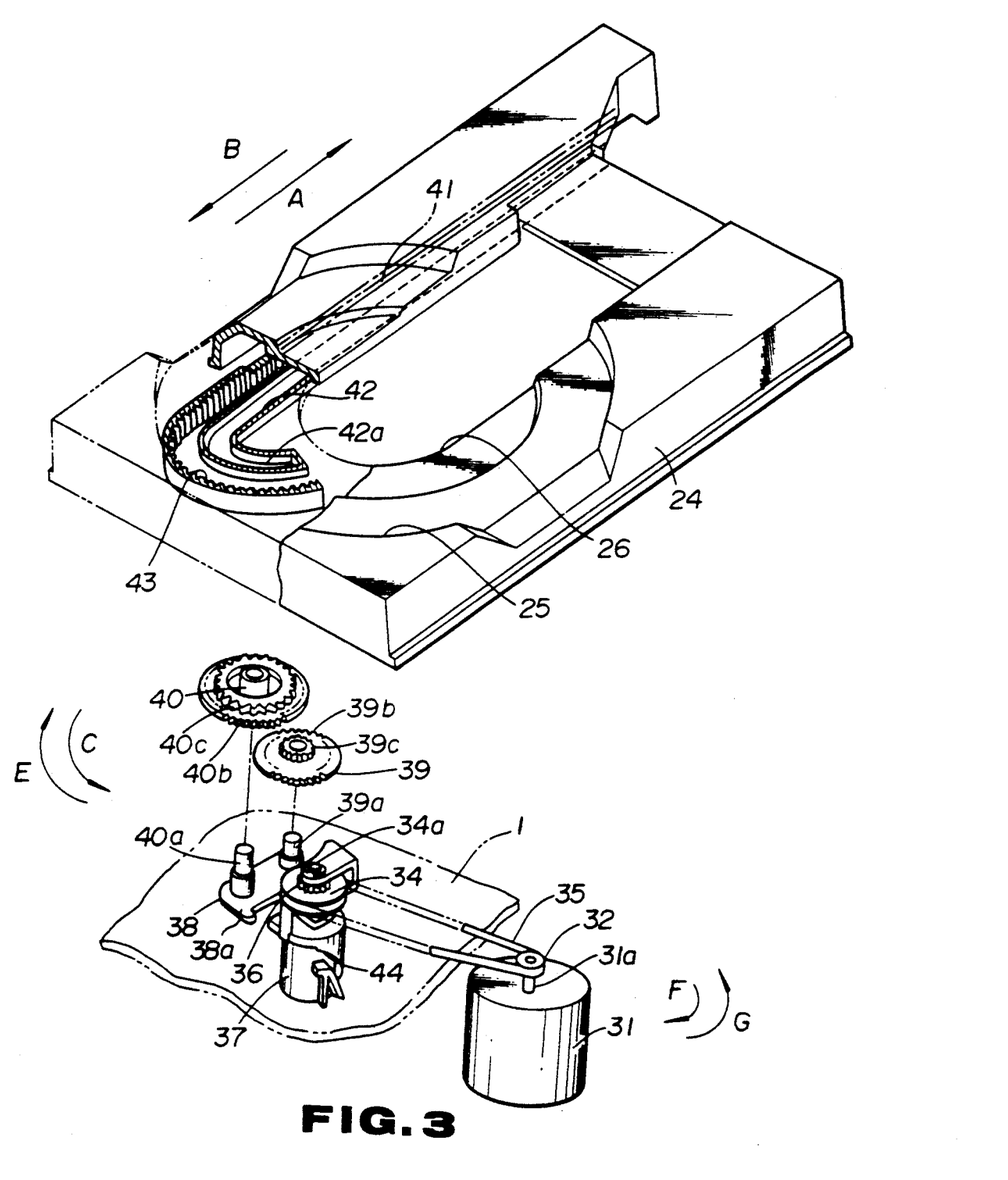
FIG. 3 is an exploded perspective view of the driving unit of the disc loading apparatus shown in FIG. 1.

With the above described disc loading mechanism, the disc driving unit 2 and the disc tray 24 are moved in response to operation of an electric motor 31 mounted on the lower surface of the chassis 1, towards the other lateral side of the chassis 1. The driving shaft 31a of the motor is extended vertically relative to the chassis 1 to the upper side of the latter by way of a through-hole 33 formed in the chassis 1. A first pulley 32 is mounted on the distal end of the motor shaft 31a, as shown in FIGS. 2 and 3. An endless driving belt 35 is placed between the first pulley 32 and a second pulley 34 rotatably supported by a supporting shaft 34a near the one lateral side of the chassis 1. The second pulley 34 is formed with a coaxial gear section 36. A cam shaft 37 coaxial with the second pulley 34 and a rotary arm 38 are supported by the supporting shaft 34a for rotation with respect to the chassis 1. The cam shaft 37 and the rotary arm 38 are rotatably coupled to each other. The cam shaft 37 extends downwardly from the chassis 1, while the rotary arm 38 is disposed on the upper surface of the chassis 1. First and second gear supporting shafts 39a, 40a are mounted vertically on the upper surface of the rotary arm 38. A first speed-reducing transmission gear 39 is rotatably mounted on the first gear supporting shaft 39a. A second speed-reducing transmission gear 40 is rotatably mounted on the second gear supporting shaft 40a. These speed-reducing transmission gears 39, 40 are, respectively, formed by larger diameter gear sections 39b, 40b and lesser diameter gear sections 39c, 40c, formed coaxially and integrally therewith. These speed-reducing transmission gears 39, 40 are so arranged and constructed that the larger diameter gear section 39b of the first gear 39 meshes with the gear section 36 of the second pulley 34 and the lesser diameter gear section 39b of the first gear 39 meshes with the larger diameter gear section 40b of the second gear 40.

When the circular recess 25 of the disc tray 24 is protruded towards the forward side of the chassis 1, the lesser diameter gear section 40c of the second speed-reducing transmission gear 40 meshes with a rack gear section 41 formed on the lower surface of the disc tray 24 facing the chassis 1. This rack gear section 41 is provided on the side of the tray 24 associated with the supporting shaft 27 parallel to the shaft 37 in the fore and aft direction. The lower surface of the disc tray 24 is formed with a guide groove 42 parallel to the rack gear section 41 for engagement by the distal end of the second gear supporting shaft 40a. That is, when the lesser diameter gear section 40c of the second speed-reducing transmission gear 40 meshes with the rack gear section 41, the distal end of the second gear supporting shaft 40a is engaged in the guide groove 42. Thus, even if the driving power of the driving motor 31 is transmitted to the speed-reducing transmission gears 39, 40, the rotary arm 38 of the cam gear 37 is not actuated into rotation.

An arcuate internal gear section 43 is formed as a continuation of the rack gear section 41 on the forward side of the disc tray 24. An arcuate guide groove section 42a is also formed as a continuation of the guide groove 42 on the forward side of the disc tray 24 in association with the internal gear section 43 so as to lie inwardly of the gear section 43. When the disc tray 24 is positioned adjacent the disc table 10, the gear section 43 and the arcuate guide groove section 42 are on arcs of circles having the supporting shaft 34a as the center.

Figure 8:
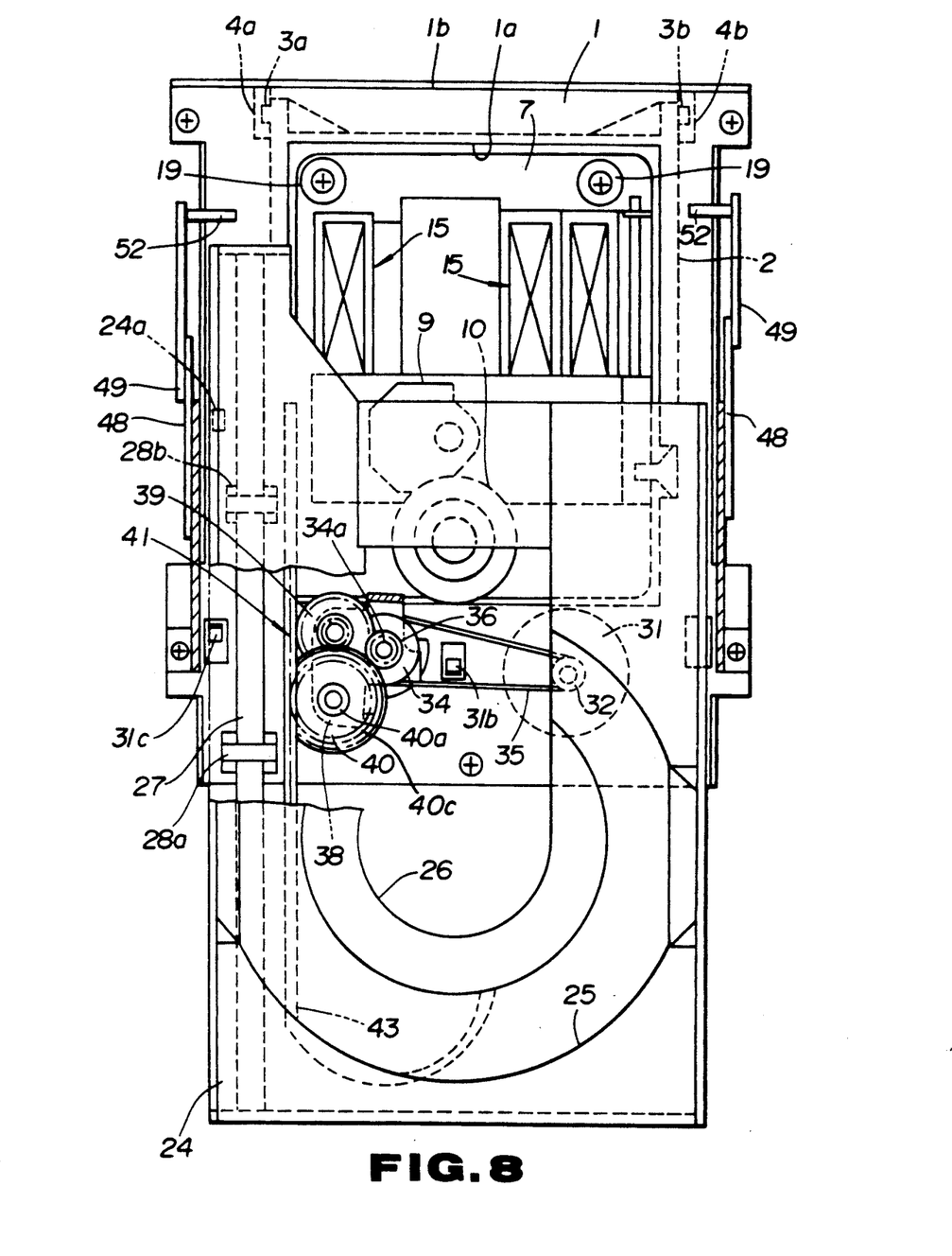
FIG. 8 is a plan view of the disc loading apparatus shown in FIG. 1 in the unloaded state, with a portion thereof being broken away.

With the lesser diameter gear section 40c of the second speed-reducing gear 40 meshing with the rack gear section 41, as shown in FIG. 8, rotation of the first pulley 32 by the driving motor 31 in the forward direction as indicated by an arrow F in FIG. 3, causes the driving power to be transmitted to the second speed-reducing transmission gear 40 so that the disc tray 24 is moved rearwardly, as indicated by arrow A in FIG. 3. When the first pulley 32 is rotated by the driving motor 31 in the reverse direction, as indicated by arrow G in FIG. 3, the driving power is transmitted to the second speed-reducing transmission gear 40 so that the disc tray 24 is moved forwardly, as indicated by arrow B in FIG. 3.

Figure 9:
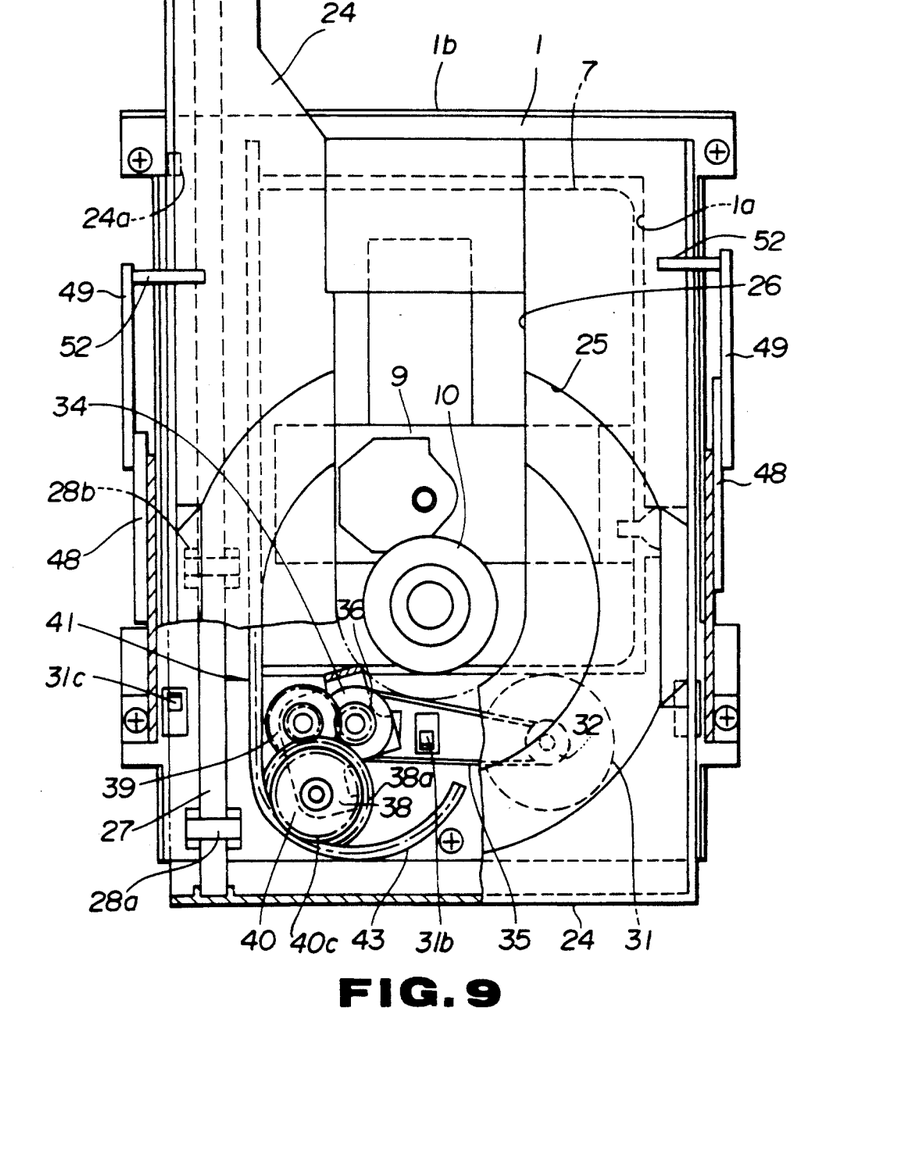
FIG. 9 is a plan view of the disc loading apparatus shown in FIG. 1, with the apparatus being shown in the course of the loading operation and with a portion thereof being broken away.
Figure 10:
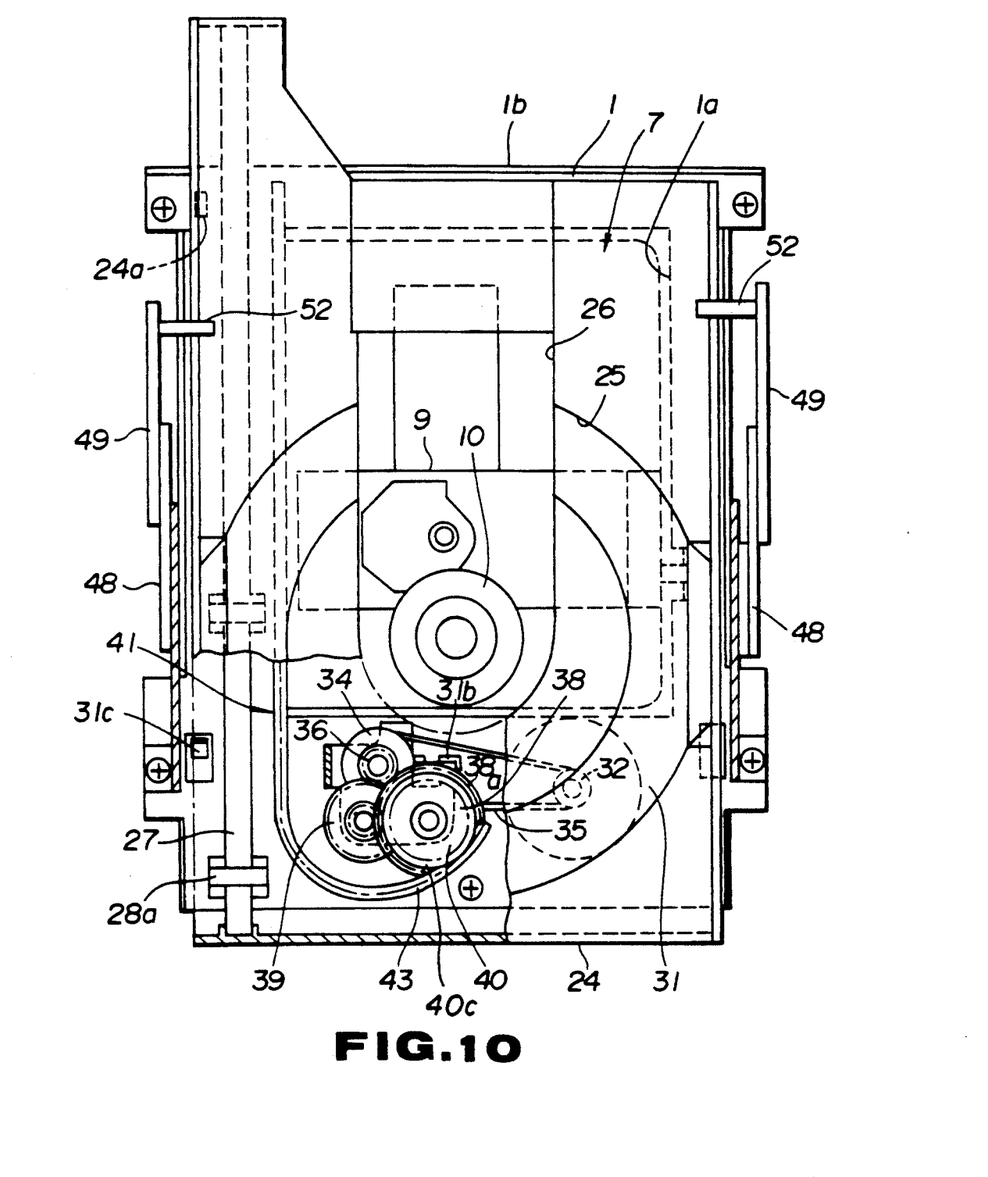
FIG. 10 is a plan view showing the disc loading apparatus in the loading complete state, with a portion thereof being broken away.

When the disc tray 24 is moved rearwardly, that is, towards the disc table 10, as shown in FIGS. 9 and 10, and the first pulley 32 is further rotated by the driving motor 31 in the forward direction indicated by an arrow F in FIG. 3, the driving power is transmitted to the second speed-reducing transmission gear 40, with the lesser gear section 40c of the second speed-reducing transmission gear 40 meshing with the internal gear section 43. Simultaneously, the distal end of the second gear supporting shaft 40a is guided by the arcuate guide groove section 42a of the guide groove 42, with the gear section 36 of the section pulley 34 acting as the sun gear and the second speed-reducing reducing transmission gear 40 acting as the planetary gear. Thus, the rotary arm 38 and the cam shaft 37 are rotated in the counterclockwise direction, as indicated by arrow C in FIG. 3. Conversely, when the first pulley 32 is rotated by the driving motor 31 in the reverse direction as indicated by arrow G in FIG. 3, the gear section 36 of the second pulley 34 acts as the sun gear and the second speed-reducing transmission gear 40 acts as the planetary gear, causing the rotary arm 38 and the cam shaft 37 to be rotated in the clockwise direction as indicated by arrow E in FIG. 3.

When the driving motor 31 is driven in the forward direction and the rotary arm 38 is rotated to a predetermined position in the counterclockwise direction as indicated by arrow C in FIG. 3, the distal end 38a of the rotary arm 38 abuts against and actuates a first limit switch 31b (FIG. 10) provided on the chassis 1 to stop the operation of the driving motor 31. Conversely, when the driving motor 31 is driven in the reverse direction, and the disc tray 24 is moved to a predetermined position towards the forward side as shown by arrow B in FIG. 3, the projection 24a provided on the rear lower side of the disc tray 24 on its one lateral side abuts against and actuates a second limit switch 31c provided on the chassis 1 to stop the operation of the driving motor 31.

Figure 4:
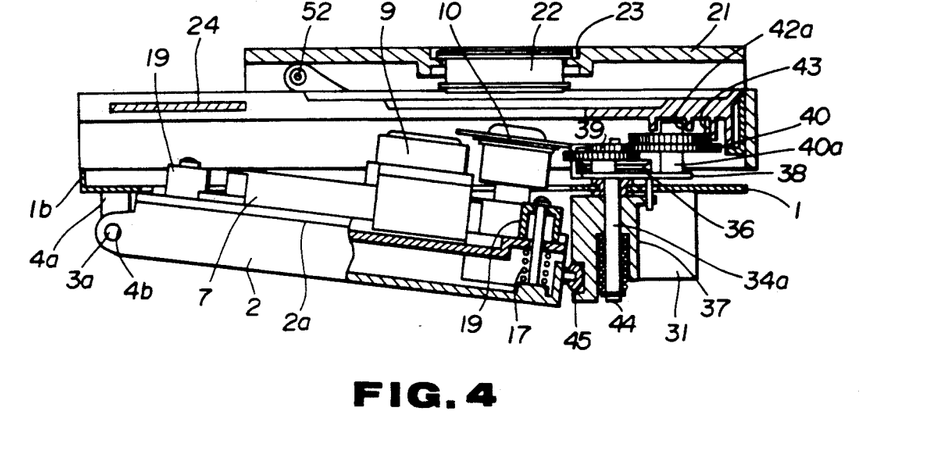
FIG. 4 is a side elevation showing a lateral side of the disc loading apparatus shown in FIG. 1 in the unloaded state, with a portion thereof being broken away.
Figure 5:
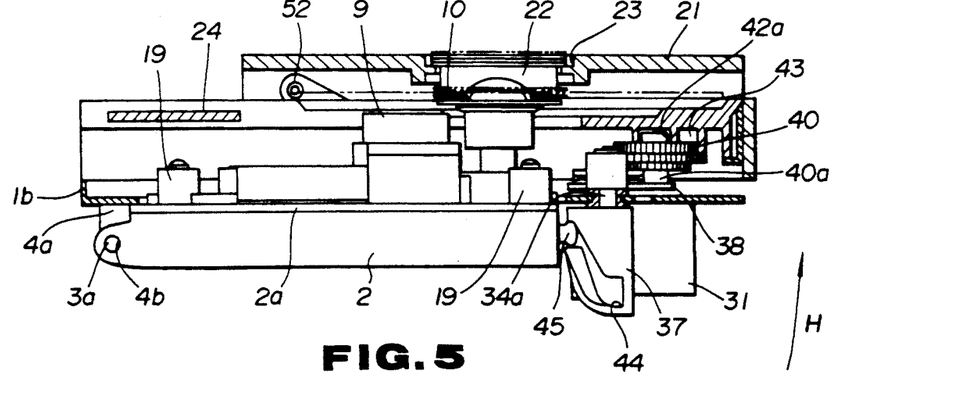
FIG. 5 is a side elevation showing the same lateral side as in FIG. 4 of the disc loading apparatus shown in FIG. 1 in the loading complete state, with a portion thereof being broken away.

A helical cam groove 44 is formed on the outer surface of the cam shaft 37. As shown in FIGS. 4 and 5, an engaging pin 45 provided on the forward side of the disc drive unit supporting plate 2 is engaged in cam groove 44. Thus, when the cam shaft 37 is rotated in the counterclockwise direction, as shown by arrow C in FIG. 3, with the disc drive unit supporting plate 2 spaced apart from the chassis 1, as shown in FIG. 4, the engaging pin 45 is moved along the axis of the cam shaft 37 towards the chassis 1, with the disc drive unit supporting plate 2 being rocked thereby in a direction of abutting against the chassis 1, as indicated by arrow H in FIG. 5. This movement continues until the disc table 10 is at a position substantially abutting against the disc holding unit 22.

Conversely, when the cam shaft 37 is rotated in the clockwise direction, as indicated by arrow E in FIG. 3, with the disc drive unit supporting plate 2 initially abutting the chassis 1 as shown in FIG. 5, the engaging pin 45 is moved along the axis of the cam shaft 37 in a direction away from the chassis 1. This causes the disc drive unit supporting plate 2 to be rocked in the direction indicated by arrow H in FIG. 5, causing it to become spaced apart from the chassis, as shown in FIG. 4.

It is noted that, for reducing the friction between the cam shaft 37 and the engaging pin 45, these members are formed of synthetic resin or like material.

Referring again to FIGS. 1 and 2, thrusting supporting units 46, 47 are provided on the first and second side wall sections 20a, 20b, respectively. These thrusting supporting units 46, 47 are adapted for thrusting and supporting the disc tray 24 with respect to the chassis 1 in the vertical direction, that is, in a direction normal to the plane of motion of the disc tray 24, when the disc tray 24 is moved towards the disc table 10 and the disc drive unit supporting plate 2 is rocked towards the chassis 1.

Figure 6:
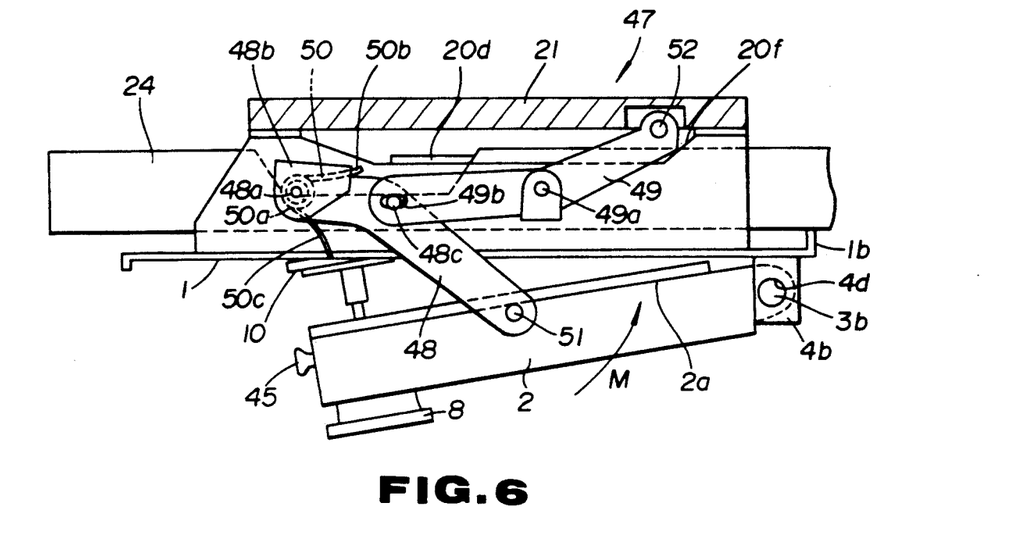
FIG. 6 is a side elevation showing the lateral side opposite to that of FIGS. 4 or 5 of the thrusting supporting unit of the disc loading apparatus shown in FIG. 1, with the thrusting supporting unit being shown in the unloaded state and with a of the thrusting supporting unit being broken away.
Figure 7:
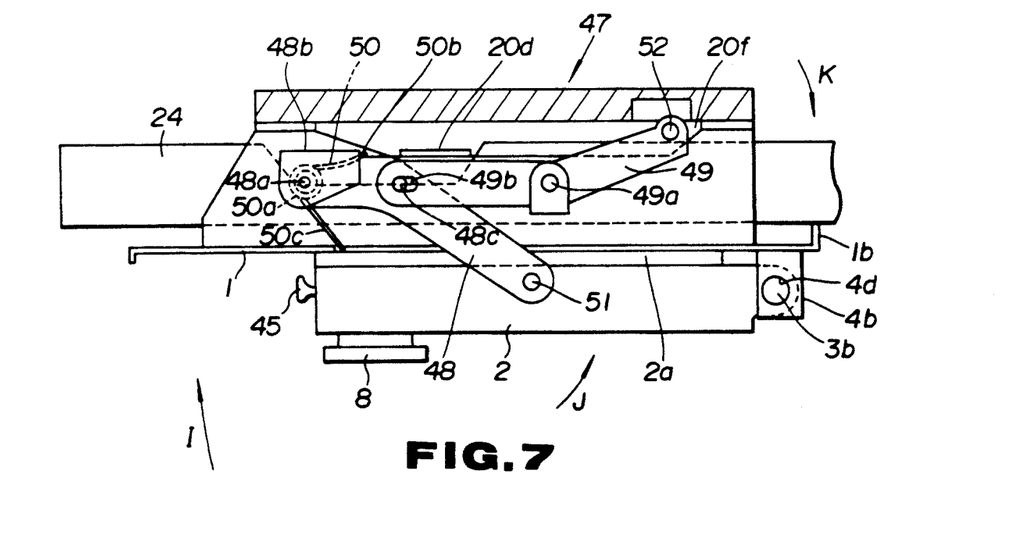
FIG. 7 is a side elevation showing the same lateral side as in FIG. 6 of the thrusting supporting unit, in the loading complete state and with a portion of the unit being broken away.

Referring to FIGS. 1, 6 and 7, each of the thrusting supporting units 46, 47 is constituted by first and second links 48, 49 rotatably supported with respect to the side wall sections 20a, 20b. Each of the first links 48 has its proximal side rotatably supported by a pivot shaft 48a provided on the forward outer surface of the side wall sections 20a, 20b. Actuatable pins 51 are provided on the opposite inner sides on the distal ends of the first links 48. These actuatable pins 51 are positioned below the chassis 1. The distal ends of these actuatable pins 51 face the lower surface of engaging flanges 2a on both lateral edges of the disc drive unit supporting plate 2. Each of these first links 48 is biased into upwards rotation, as indicated by arrow M in FIG. 6, by a torsion coil spring 50. Torsion coil springs 50 have coil sections 50a wrapped around pivot shafts 48a and arm sections 50b, 50c abutting, respectively, against an abutment member 48b provided on the proximal side of the first link 48 and against the chassis 1. Hence, when the disc drive unit supporting plate 2 is spaced apart from the chassis 1, as shown in FIG. 6, the distal ends of the actuatable pins 51 are in pressure contact with the lower surfaces of the engaging flanges 2a.

With reference now to FIGS. 1, 6 and 7, each of the second links 49 has its intermediate portion rotatably supported by a pivot shaft 49a provided on the central outer sides of the side wall sections 20a, 20b. The forward end portions of the second links 49 have elongated openings 49b in which are engaged connecting pins 48c provided on the intermediate portions of the first links 48. On the other, or rear, end portions of the second links 49 are thrusting pins 52 which are positioned above the disc tray 24. Cutouts 20e, 20f formed in the upper portions of the side wall sections 20a, 20b permit the thrusting pins 52 to directly face the region above the disc tray 24 from outside of these side wall sections 20a, 20b.

With the above described thrusting supporting units 46, 47, when the disc drive unit supporting plate 2 is spaced apart from the chassis 1, the actuatable pins 51 abut against the disc drive unit supporting plate 2 and the first links 48 are turned downwards against the bias of the torsion coil spring 50. Thus, the second links 49 are rotated so that the other ends thereof move upwards with the thrusting pins 52 spaced apart from the disc tray 24 as in FIG. 6.

When the disc drive unit supporting plate 2 is rotated towards chassis 1, as indicated by arrow I in FIG. 7, the first links 48 are rotated counterclockwise, in the direction of arrow J in FIG. 7, under the bias of the torsion coil springs 50. At the same time, the second links are turned so that the other ends thereof move downwards, with the thrusting pins 52 abutting against the disc tray 24. This rotation causes the thrusting pins 52 to be brought into abutment with the disc tray 24, under the bias of the torsion coil spring 50, for thrusting and supporting the disc tray 24 against the chassis 1. As can be seen in FIG. 1, an annular buffer rubber piece or bushing 52a is fitted to the distal end of each of the thrusting pins 52 for positively pressing and supporting the disc tray 24 and inhibiting vibrations of the thus supported disc tray.

When the disc tray 24 is thrust and supported by the thrusting supporting units 46, 47, the rear end side of disc tray 24 is supported by and rests on the upper end of the upright rear wall section 1b of the chassis 1, as shown in FIG. 7. Furthermore, although not visible in FIG. 7, the disc tray 24 is also stably supported by the upright wall section 1b, guide roll 29 and the disc tray supporting members 28a, 28b.

To load the disc by the above described disc loading unit embodying the present invention, the driving motor 31 is driven in the reverse direction and, as shown in FIG. 8, the disc tray 24 is moved forwardly so that the circular recess 25 in the disc tray 24 protrudes from the forward side of the casing of the loading unit. The record disc (not shown) can then be correctly placed within the recess 25.

With the record disc (not shown) correctly in place, driving motor 31 is then driven in the forward direction. As shown in FIG. 9, this causes the disc tray 24 to be moved towards the rear, that is, towards the disc table 10. Since the disc drive unit supporting plate 2 is spaced apart from the lower surface of the chassis at this time, as shown in FIG. 4, the disc is moved over the disc table 10 and the optical pickup unit 9 without abutting against the disc table 10 or the optical pickup unit 9. At this time, the state of the thrusting supporting units 46, 47 is such that the thrust pins 52 are spaced apart from the disc tray 24, enabling the disc tray 24 to be moved smoothly.

With further continued rotation of the driving motor 31 in the forward direction, the disc tray 24 is moved until the center of the disc is on the axis of the disc table 10. At this time the disc tray 24 is stopped and, as shown in FIGS. 5 and 10, the rotary arm 38 and the cam shaft 37 are rotated in the counterclockwise direction. The disc drive unit supporting plate 2 is then rocked towards the chassis 1 in the direction of arrow H in FIG. 5. In this manner, the record disc is clamped between the disc table 10 and the disc holding unit 22. The state of the thrusting and supporting units 46, 47 at this time is such that, as shown in FIG. 7, the thrusting pins 52 are brought into abutment with the disc table 24 for thrusting and supporting the disc tray 24 against chassis 1.

The disc mounted between the disc table 10 and the disc holding unit 22 can then be rotated by the spindle motor 8 so that predetermined information signals can be written on and/or read from the disc by means of the pickup unit 9.

With the above described disc recording and/or reproducing apparatus, because the disc tray 24 is thrust and supported against the chassis 1, it becomes possible to prevent vibrations of the disc tray 24 due to extraneous vibration or vibrations from the focusing or tracking servo while causing the objective lens 9a of the optical pickup unit 9 to be shifted in the recording and-/or reproducing mode.

When it is desired to remove the disc from the disc recording and/or reproducing apparatus it suffices to drive the driving motor 31 in the reverse direction, whereby the disc drive unit supporting plate 2 is separated from the chassis 1 and the disc tray 24 is moved forwards out of the casing. The disc may then be removed.

Figure 11:
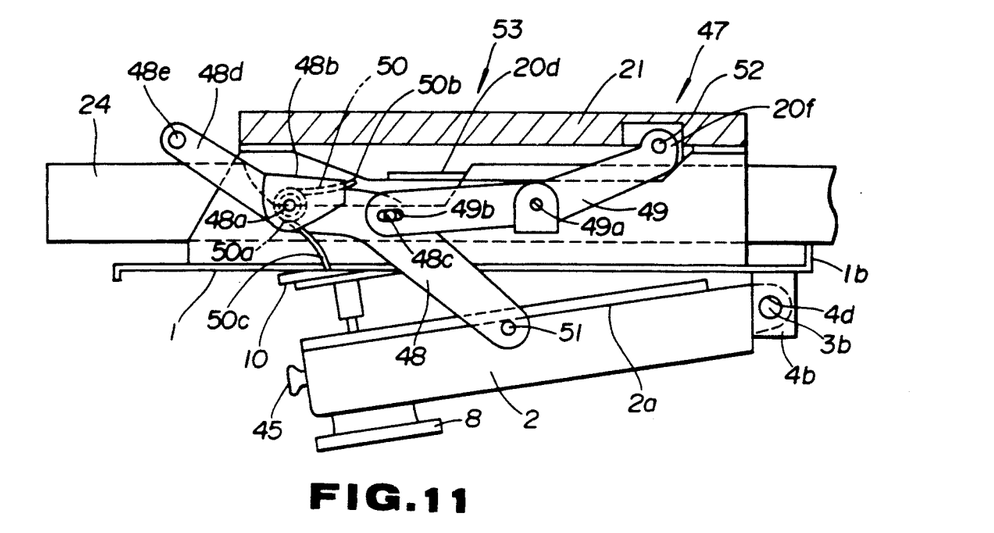
FIG. 11 is a side elevation, showing the same lateral side as in FIGS. 6 or 7, of another embodiment of a thrusting and supporting unit provided in the disc loading apparatus, with the thrusting and supporting unit being shown in the unloaded state and with a portion thereof being broken away.

The loading apparatus of the present invention is not limited to the above described arrangement of the thrusting and supporting units 46, 47. In an alternative thrusting and supporting unit 53 shown in FIGS. 11 and 12, the proximal ends of the first links 48 are provided with arm sections 48d facing the region above the forward side of the disc tray 24 and forward thrusting pins 48e are provided on the opposite inner sides of these arm sections 48d.

Figure 12:
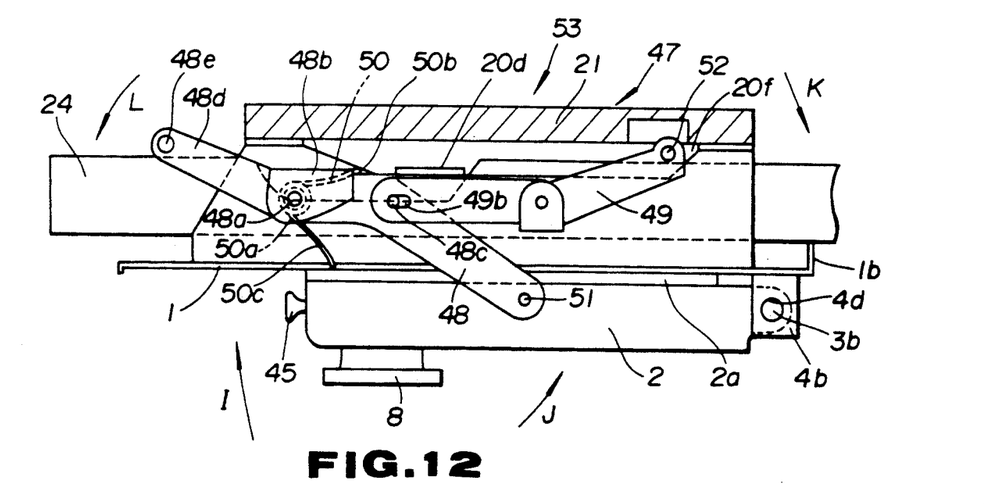
FIG. 12 is a side elevation showing the same lateral side as in FIG. 11, of the modified embodiment of the thrusting and supporting unit in the loading complete state, with a portion thereof being broken away.

With the thrusting and supporting unit 53, when the disc drive unit supporting plate 2 has been rocked towards the chassis 1, as shown in FIG. 12, the thrusting pins 52 are brought into abutment with the upper surface of the disc tray 24, under the bias of the torsion coil springs 50, similarly to the thrusting supporting units 46, 47. At the same time, the forward thrusting pins 48e of the arm sections 48d are brought into abutment with the forward upper surface of the disc tray 24 in the direction of arrow L in FIG. 12. Hence, with the thrusting supporting unit 53, the disc tray 24 is acted on by pressure at four points on its upper surface when the disc drive unit supporting plate 2 has been rocked towards the chassis 1. In this way, the disc tray 24 may be more stably supported by the chassis 1.

Although various embodiments of the present invention, and modifications thereof, have been described in detail herein with reference to the accompanying drawings, it is to be understood that the invention is not limited to those precisely mentioned embodiments and modifications, and that various changes and further modifications may be effected therein by one skilled in the art without departing from the scope or spirit of the invention as defined in the appended claims.

I claim:

1. In an apparatus having a player section for reproducing signals recorded on a disc-shaped recording medium, a loading device comprising:
   disc transport means including a disc tray adapted to be movable in a plane between a disc-exchanging position remote from said player section for exchanging a disc-shaped recording medium and a loaded position proximate to said player section; and
   means thrusting against said disc tray in said loaded position for suppressing vibrations in said disc tray during reproducing by said player section of the signals recorded on said disc-shaped medium, said means for suppressing vibrations being adapted to thrust said disc tray in a direction normal to the plane in which said disc tray is movable between said disc-exchanging and loaded positions in response to rocking of said player section relative to said disc tray, said means for suppressing vibrations including a first link adapted to be rotated in response to said rocking of said player section and a second link, said second link having a free end and being rotated by rotation of said first link in a first direction to cause thrusting of the disc tray by the free end of said second link.

2. In an apparatus having a player section for reproducing signals recorded on a disc-shaped recording medium, a loading device comprising:
   disc transport means including a disc tray adapted to be movable in a plane between a disc-exchanging position remote from said player section for exchanging a disk-shaped recording medium and a loaded position proximate to said player section; and
   means thrusting against said disc tray in said loaded position for suppressing vibrations in said disc tray during reproducing by said player section of the signals recorded on said disc-shaped medium, said means for suppressing vibrations being adapted to thrust said disc tray in a direction normal to the plane in which said disc tray is movable between said disc-exchanging and loaded positions in response to rocking of said player section relative to said disc tray, said means for suppressing vibrations including a first link and a second link, said first link having a free end and being rotated by said rocking of said player section for thrusting said disc tray by said free end of said first link in a direction normal to the plane of motion of said disc tray, said second link having a free end and being rotated by rotation of said first link in a direction for thrusting said free end thereof against said disc tray to cause thrusting of said disc tray by the free end of the second link.

3. A recording and/or reproducing apparatus for recording signals on, or reproducing recorded signals from a record disc comprising:
   a supporting base member,
   a movable base member having a disc table mounted thereon, said disc table having an axis and being adapted to be rotated about said axis with said record disc on said disc table, said movable base member being supported by said supporting base member for movement substantially in the direction of said axis of said disc table between operative and retracted positions of said table,
   a disc holding unit mounted in opposition to said disc table and adapted for clamping said disc in cooperation with said disc table when said disc table approaches thereto in moving to said operative position,
   a disc tray having a recess with arcuate peripheral portions concentric with a center of said recess for seating the disc therein and being supported by said supporting base member for movement in a plane substantially normal to the axis of said disc table between a disc-exchanging position in which said center of the recess is remote from said axis of the disc table for facilitating exchanging of said disc in said recess and a loaded position in which said center of the recess is substantially aligned with said axis of the disc table when the latter is in said operative position and in which said disc table displaces said disc out of said recess in the direction of said axis in moving to said operative position, and
   thrusting and supporting means mounted on said supporting base member and being engageable with said disc tray only in said loaded position of the latter for thrusting and supporting said disc tray against said supporting base member in a direction normal to said plane of motion of said disc tray in response to movement of said movable base member to said operative position of the disc table for clamping said disc between said disc table and said disc holding unit, thereby to prevent vibration of said disc tray out of which said disc has been displaced.

4. The recording and/or reproducing apparatus according to claim 3, wherein said thrusting and supporting unit is adapted for thrusting against and supporting said disc tray at a plurality of positions on said disc tray.

5. A recording and/or reproducing apparatus for recording signals on, or reproducing recorded signals from a record disc comprising:
   a supporting base member,
   a movable base member having a disc table mounted thereon, said disc table having an axis and being adapted to be rotated about said axis with said record disc on said disc table, said movable base member being supported by said supporting base member for movement substantially in the direction of said axis of said disc table, a disc holding unit mounted in opposition to said disc table and adapted for clamping said disc in cooperation with said disc table when said table approaches thereto, a disc tray supported by said supporting base member for movement in a plane substantially normal to the axis of said disc table, and a thrusting and supporting unit operable for thrusting against and supporting said disc tray, at a plurality of positions on said disc tray, against said supporting base member in a direction normal to the plane of motion of said disc tray when said disc tray is moved in said plane towards said disc table and said movable base member is moved in a direction for clamping said disc between said disc table and said disc holding unit, said thrusting and supporting unit including a first link rotated in a predetermined direction by movement of said movable base member in said direction for clamping said disc, and a second link having a free end and being rotated by rotation of said first link in said predetermined direction for thrusting said disc tray by the free end of the second link.

6. The loading apparatus according to claim 5, wherein a buffer member is provided at the free end of said second link.

7. A recording an/or reproducing apparatus for recording signals on, or reproducing recorded signals from a record disc comprising:

a supporting base member, a movable base member having a disc table mounted thereon, said disc table having an axis and being adapted to be rotated about said axis with said record disc on said disc table, said movable base member being supported by said supporting base member for movement substantially in the direction of said axis of said disc table, a disc holding unit mounted in opposition to said disc table and adapted for clamping said disc in cooperation with said disc table when said table approaches thereto, a disc tray supported by said supporting base member for movement in a plane substantially normal to the axis of said disc table, and a thrusting and supporting unit operable for thrusting against and supporting said disc tray, at a plurality of positions on said disc tray, against said supporting base member in a direction normal to the plane of motion of said disc tray when said disc tray is moved in said plane towards said disc table and said movable base member is moved in a direction for clamping said disc between said disc table and said disc holding unit, said thrusting and supporting unit including a first link and a second link, said first link having a free end and being adapted to be rotated by movement of said movable base member in said direction for clamping said disc for thrusting said disc tray at the free end of the first link, said second link having a free end and being rotated by rotation of said first link in a direction for thrusting said free end thereof against said disc tray to cause thrusting of said disc tray by the free end of the second link.

8. The loading apparatus according to claim 7, wherein buffer members are provided at the free ends of said first and second links.

* * * * *